United States Patent

[11] 3,609,237

[72] Inventor Heinz Joseph Gerber
West Hartford, Conn.
[21] Appl. No. 793,974
[22] Filed Jan. 27, 1969
[45] Patented Sept. 28, 1971
[73] Assignee The Gerber Scientific Instrument Company
South Windsor, Conn.

[54] LINE OR EDGE DIGITIZING SYSTEM WITH MEANS FOR AUTOMATICALLY OUTPUTTING ONLY DATA TRULY REPRESENTATIVE OF THE LINE OR EDGE BEING DIGITIZED

10 Claims, 7 Drawing Figs.

[52] U.S. Cl. .......... 178/18, 250/202
[51] Int. Cl. .......... G08c 21/00
[50] Field of Search .......... 250/202; 178/18, 19, 20; 235/50.27, 61 D; 340/347; 33/1 M

[56] References Cited

UNITED STATES PATENTS

| | | | |
|---|---|---|---|
| 3,502,882 | 3/1970 | Von Voros | 250/202 |
| 3,497,694 | 2/1970 | Jura et al. | 250/202 |
| 3,423,589 | 1/1969 | Bardwell et al. | 250/202 |
| 3,410,956 | 11/1968 | Grossimon | 178/19 |
| 3,403,263 | 9/1968 | Hargen | 250/202 |
| 3,383,516 | 5/1968 | Leimer | 250/219 |
| 3,335,287 | 8/1967 | Hargens | 250/227 |
| 3,333,144 | 7/1967 | Bulk | 315/10 |
| 3,297,879 | 1/1967 | Meyer | 250/237 |
| 3,209,267 | 9/1965 | Rau et al. | 328/146 |
| 2,817,021 | 12/1957 | Williams et al. | 250/239 |

*Primary Examiner*—Kathleen H. Claffy
*Assistant Examiner*—Tom D'Amico
*Attorney*—McCormick, Paulding & Huber

ABSTRACT: A digitizer for providing digital information defining the coordinates of points located along a line or edge of a map, drawing, template or other similar artwork includes a reticle manually movable along the line or edge and an associated set of optical and electronic components for automatically outputting coordinate information only when the reticle is properly positioned over the line or edge being digitized. Two modes of operation are possible—one in which the signal to output coordinate information is produced by the crossing of the line being digitized, and another in which the output of coordinate information is enabled only after a certain increment has been traversed by the reticle in either the X or Y axis from the point at which information was previously outputted.

INVENTOR
HEINZ JOSEPH GERBER
BY
McCormick, Paulding & Huber
attorneys

LINE OR EDGE DIGITIZING SYSTEM WITH MEANS FOR AUTOMATICALLY OUTPUTTING ONLY DATA TRULY REPRESENTATIVE OF THE LINE OR EDGE BEING DIGITIZED

BACKGROUND OF THE INVENTION

This invention relates to devices referred to as X–Y coordinate digitizers used for reducing the lines or edges of a map, drawing, template or other similar artwork or graphic to digital coordinate information for use by a computer or other data-processing device, and deals more particularly with such a device wherein coordinate information is automatically outputted as the reticle or other index means is moved along the line or edge being digitized.

In the case of previous digitizers, the actual digitizing of a line or edge has been a relatively slow and tedious process. For example, in digitizing a line the usual procedure followed is to move the reticle of the digitizer to a point on the line and then when the operator visually determines that the reticle is properly positioned he pushes a button or switch to cause information defining the X and Y positions of the reticle, provided by associated X and Y position encoders, to be transmitted to an associated data processor or recorder. The reticle is then moved to a new position along the line and the process repeated. In the case of a curved line, this process must be repeated at relatively close points along the length of the line, and accordingly the satisfactory reduction of such a line to its digital coordinates usually takes a relatively large amount of time and is quite fatiguing on the operator. The purpose of this invention is, therefore, to provide a system wherein an exact positioning of a reticle or similar index means relative to the line or edge being digitized, and the manual operation of a readout switch or pushbutton is eliminated, and wherein digitizing of a line may instead be obtained by merely moving the reticle or other index means back and forth across the line or edge being digitized while simultaneously moving it generally along such a line or edge or merely by moving it along the line, the system operating to automatically output coordinate information as the reticle passes proper points of registration with the line or edge.

SUMMARY OF THE INVENTION

The invention resides in a system for automatically digitizing a line or edge of an artwork, graphic of the like as a reticle or other index means is moved along the line or edge in question. The system includes a photodetector arranged to sense the light reflected from a small sensing point fixed relative thereto and movable over the surface of the artwork by movement of the photodetector the X and Y coordinate directions so as to produce a line or edge registration signal as the line or edge in question is crossed by the sensing point. An electrical control circuit responsive to this signal permits data from associated X and Y position encoders, operatively connected with the photodetector so as to define the X and Y coordinates of the sensing point, to be transmitted to an associated data processor or recorder when such a line or edge registration signal is received. This electrical circuit may include minimum displacement detectors for preventing the output of information from the X and Y encoders until after the sensing point has been moved a given minimum selectable increment in either the X or Y directions.

DESCRIPTION OF THE PREFERRED EMBODIMENTS

Figure 1:
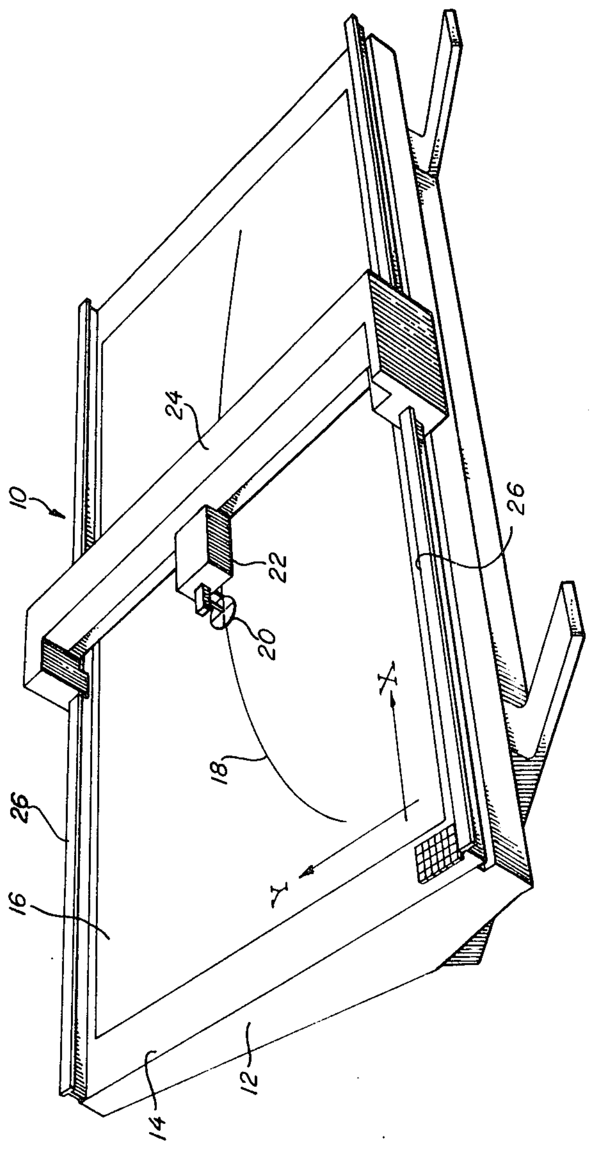
FIG. 1 is a perspective view of a digitizer embodying this invention.

Referring first to FIG. 1, this figure shows a digitizer 10 equipped with an automatic digitizing system embodying this invention. Except for the automatic digitizing system, the digitizer 10 is or may be of generally conventional construction and comprises a table 12 having a flat surface 14 for receiving and holding a sheet of paper, plastic or other material containing a map, drawing or other artwork or graphic including lines or edges which are to be digitized. In some instance, the item placed on the surface 14 may be in the nature of a pattern or template and the digitizer 10 used to digitize its edges rather than the lines or edges of a feature drawn or otherwise appearing on its face. Therefore, the term "artwork," as used herein, is used to refer to any type item which may be placed on the surface 14 of the digitizer 10 for the purpose of digitizing either its own physical edge or a line or edge of a feature drawn or otherwise appearing on is surface. In the present instance, the artwork received on the digitizer 10 of FIG. 1 is illustrated at 16 and comprises a sheet of paper having a line 18 drawn thereon, which line is to be digitized. Various means may be used for holding the sheet 16 to the surface 12 and for large digitizers, such as the one illustrated, this means preferably comprises a vacuum holddown system for applying a vacuum to the undersurface of the sheet to that it is held to the surface 14 by atmospheric pressure.

For the purpose of performing the digitizing function, the digitizer 10 includes an index means providing a visible index mark which may be moved manually along the line 18. This means may take various different forms and in the illustrated case constitutes a reticle 20 having a pair of crossed hairlines inscribed thereon for establishing an index mark at their point of intersection. The reticle 20 is in turn fixed to a Y carriage 22 in turn carried by an X carriage 24. The arrows in FIg. 1 indicate the X and Y coordinate directions. The Y carriage 22 is movable in the Y direction by movement along the length of the X carriage 24. The X carriage 24 is movable in the X direction relative to the table 12 an is supported for such movement by suitable guides or rails 26, 26 at the upper and lower edges of the table. Therefore, by combined movement of the X carriage 22 and the Y carriage 24 the reticle 20 may be moved to any position relative to the sheet 16. Although not apparent in FIG. 1, the digitizer 10, as is conventional, includes one encoder operatively connected with the X carriage 24 for providing a digital signal representing the position of the X carriage along the X coordinate axis and another encoder connected with the Y carriage 22 for providing a digital signal representing the position of the Y carriage along the Y axis. The two signals produced by these two encoders, therefore, represent the X and Y coordinates of a point on the line 18 when the reticle is properly positioned with its index mark in registration with such point. It should be understood, however, that the invention is not necessarily limited to use with the illustrated encoding system and that any other encoding system which provides output information related to the coordinate position of the reticle may be used.

Figures 2, 3, 4:
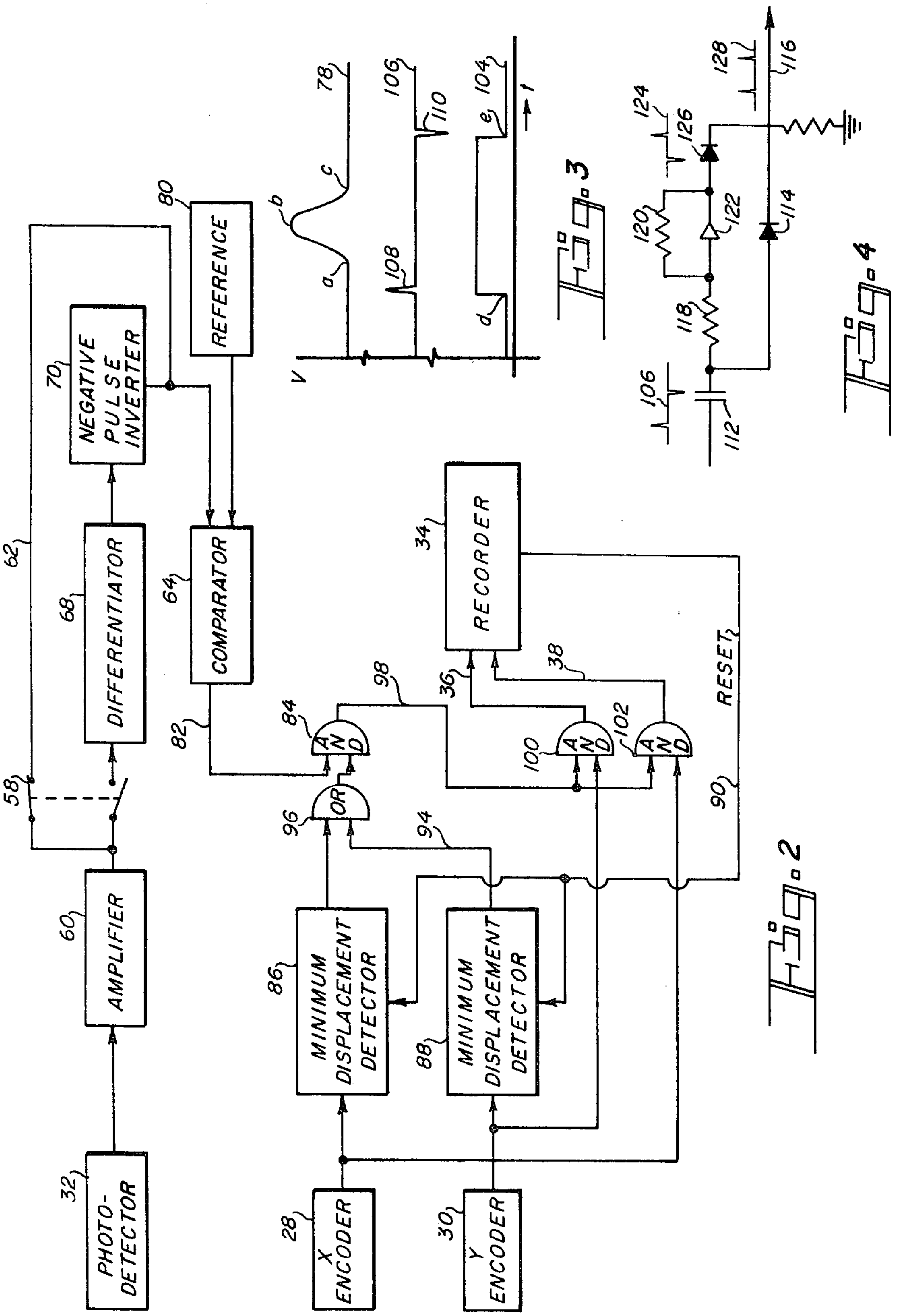
FIG. 2 is a schematic block diagram showing the automatic digitizing system of the FIG. 1 digitizer.
FIG. 3 is a diagram showing the waveforms of electrical signals appearing at various points in the FIG. 2 system as a line is crossed by the sensing point.
FIG. 4 is a schematic diagram showing the electrical circuitry of the negative pulse inverter of FIG. 2.

FIG. 2 shows in block diagram form the automatic digitizing system used by the digitizer 10 of FIG. 1 in combination with the reticle 20. In this figure, the reference numeral 28 represents the X encoder which is connected with the X carriage 24 for providing a digital signal representative of the X coordinate of the reticle 20 and the reference numeral 30 represents the Y encoder which is connected with the Y carriage 22 for providing a digital signal representing the Y coordinate of the reticle 20. Operating in combination with the encoders 28 and 30 is a photodetector 32 which senses the amount of light reflected from a small sensing point on the surface of the artwork sheet 16, and as a result of such sensing produces a signal whenever the sensing point crosses a line or edge of the artwork.

The photodetector 32 is so arranged that its sensing point is fixed to an the signals produced thereby are utilized to control the transmission of the output signals of the encoders 28 and 32 to the data-receiving device so that such transmission is permitted only when the sensing point is registered with the line or edge being digitized. The data-receiving device may take various different forms and for convenience in FIG. 2 is shown to constitute a recorder 34 used to record the received data for subsequent use with a data processor or other data-utilization device. The illustrated automatic digitizing system includes two output terminals or lines 36 and 38 on which the coordinate information transmitted to the recorder 34 appears. Other encoding systems may require similar additional output lines as a result of utilizing more than two encoders.

Figures 5, 6, 7:
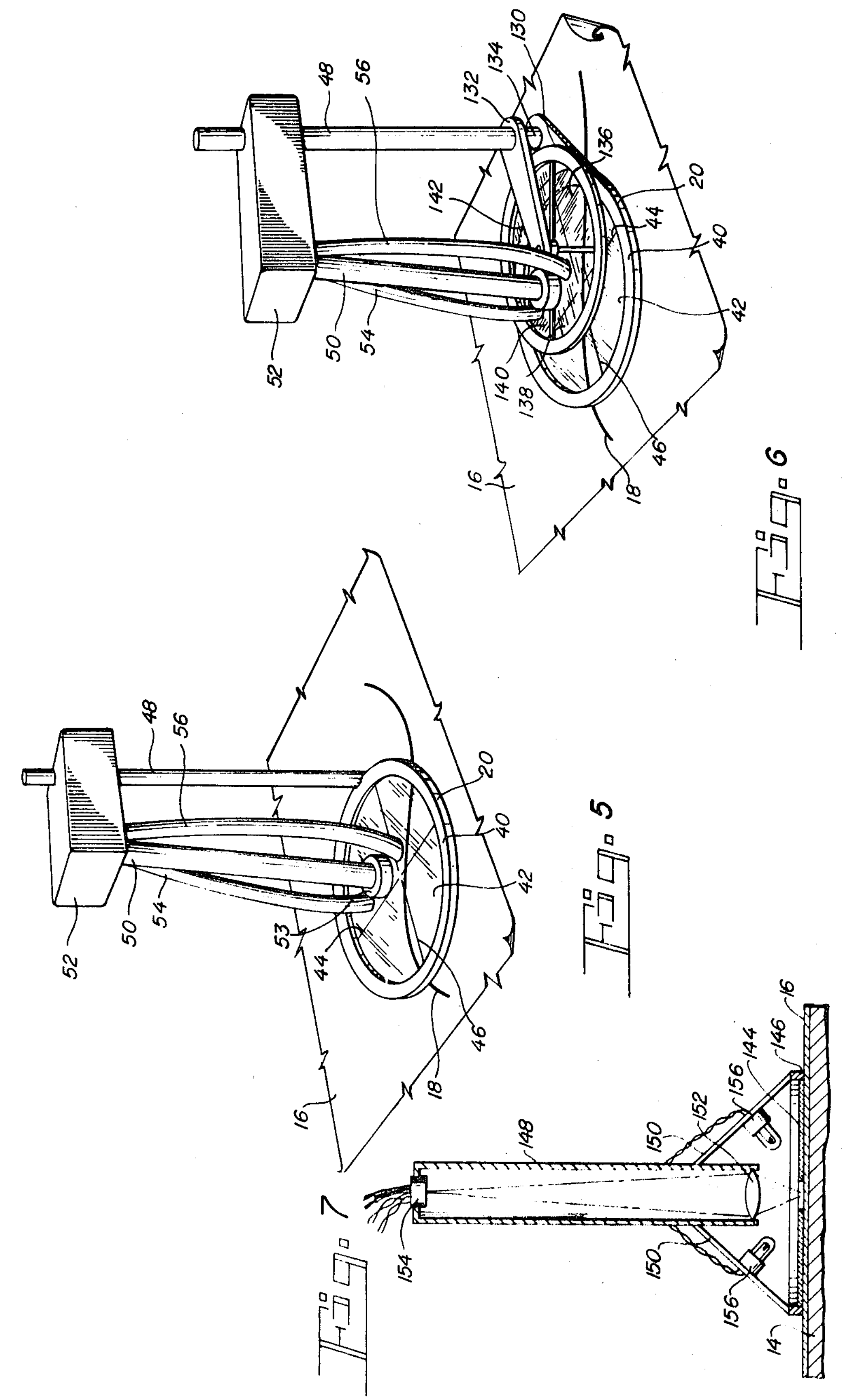
FIG. 5 is a perspective view of a reticle for use in the digitizer of FIG. 1.
FIG. 6 is a view similar to FIG. 5 but shows an alternative form of reticle equipped with an optical filter of various colors to allow selective digitizing of colored lines on multicolor artwork.
FIG. 7 is a vertical sectional view take through another form of reticle for use with the digitizer of FIG. 1.

The photodetector 32 of FIG. 2 may take many different forms, however, for the purpose of illustration, one preferred construction is shown in FIG. 5. Referring to this FIG., the reticle 20 is there shown to comprise a ring 40 supporting a circular disc 42 of thin clear glass having hairlines 44 and 46 inscribed thereon. The intersection of the hairlines 44 and 46 constitutes the index point of the reticle, however, the lines do not actually extend to this point and terminate a short distance therefrom so as to provide a clear area at the index point. The reticle 20 is supported from the Y carriage 22 by a vertical post 48 fixed to the carriage and to the ring 40 of the reticle.

The photodetector 32 of FIG. 2, in the construction of FIG. 5, comprises a fiber optic bundle 50 extending from a point close to the article 22 to a housing 52 fixed to the post 48. At the lower end of the fiber optic bundle 50 is a lens 53. The lens 53 has as its object a small point on the surface of the artwork sheet 16 and acts to concentrate the light rays emanating from this point onto the associated lower end of the fiber optic bundle 50. This small point is referred to as the sensing point of the photodetector, and the fiber optic bundle 50 and lens 53 are so arranged that this sensing point is fixed relative to and registered with the index point of the reticle 20. Therefore, when the index point of the reticle is registered with the line or edge being digitized the sensing point of the photodetector is likewise registered with such line or edge. The light rays picked up by the lens 52 are transmitted by the fiber optic bundle 52 to a photosensor, such as a photodiode or photocell, located within the housing 52 and this photosensor in turn provides voltage signals representative of the amount of light picked up by the lens 53.

Means are also preferably provided for illuminating the artwork surface in the area of the photodetector sensing point, and in FIG. 5, such means are shown to constitute two additional fiber optic bundles 54 and 56. A source of light, such as an incandescent lamp, is located within the housing 52 and the fiber optic bundles 54 and 56 have their upper ends exposed to such source. The bundles extend downwardly from the housing 52 and have their lower ends so arranged so as to project the transmitted light onto an area of the artwork surface including the sensing point of the photodetector.

It should be understood that in the construction of FIG. 5, the reticle serves to provide a visible index point enabling the operator to maintain the sensing point of the photodetector close to the line or edge being digitized. Because of the automatic digitizing ability of the system, however, the reticle is not always essential and may in some instances be omitted without departing from the invention, the lower end of the photodetector, or the illuminating light spot, in such case being capable of being used as a coarse and sufficient index point.

Referring now again to FIG. 2 for a more complete description of the system there shown, the system may be used for automatically digitizing either a line or an edge. The conditioning of the system for either edge or line digitizing is controlled by a switch 58. The photodetector 32 has its output connected to an amplifier 60, and in the position shown the switch 58 is set for line digitizing so that the output of the amplifier is connected directly through the line 62 to a comparator 64. In the alternate position of the switch 58, used for edge digitizing, the amplifier 60 is disconnected from the line 62 and is instead connected to the comparator 64 through a differentiator 68 and a negative pulse inverter 70.

Considering first the operation of the FIG. 2 system as conditioned for line digitizing—that is, with the switch 58 in its illustrated position—the photodetector 32 produces a voltage signal related to the amount of light picked up thereby from its sensing point so when such sensing point passes from an area of high reflectivity to an area of low reflectivity, as when crossing a line drawn on the artwork sheet 16, a changing signal is produced by the photodetector, and this is amplified by the amplifier 60. The line 78 of FIG. 3, for example, shows the nature of the voltage waveform produced by the amplifier 60 as the sensing point of the photodetector crosses a line, FIG. 3 being a plot of voltage on the vertical axis versus time on the horizontal axis. The waveform 78 is one produced when the sensing point has a diameter of approximately the same magnitude as the width of the line being digitized, which size relationship is desirable for line digitizing, and as the sensing point is moved across the line in a direction generally normal thereto. The point *a* is the point at which the sensing point first encounters one edge of the line, the point *b* is the point at which the sensing point is centered with the line, and the point *c* is the point at which the sensing point leaves the opposite edge of the line. It will, therefore, be noted from the waveform 78 of FIG. 3 that when the sensing point is centered on a line a maximum voltage signal is produced.

The voltage signal appearing at the output of the amplifier 60 is, as mentioned, transmitted by the line 62 to the comparator 64. Also supplied to the comparator 64 is a reference voltage provided by a reference source indicated at 80. The comparator 64 compares the signal voltage with the reference voltage and produces an output on its output line 82 whenever the signal voltage exceeds the reference voltage. The reference voltage is in turn adjusted so as to have a value only slightly less than the signal voltage produced when the sensing point is centered with the line being digitized, and accordingly an output signal is produced when the sensing point is centered with the line being digitized, and accordingly an output signal is produced from the comparator 64 on the line 82 only when such approximately centered condition of the sensing point relative to the line exists.

The signal from the comparator 64 appearing on the line 82 is used to control the transmission of the output of the encoders 28 and 30 to the recorder 34 so that such signals are received by the recorder only when the sensing point of the photodetector is centered on the line being digitized. However, means are also preferably provided for additionally controlling the transmission of the encoder signals to the recorder so that such signals are transmitted only after the sensing point has moved a given increment in either the X or Y coordinate directions from the last recorded position. In the illustrated case, this means comprises tow minimum displacement detectors 86 and 88 connected respectively to the X and Y encoders 28 and 30 and also to the recorder 34 through a reset line 90. Each minimum displacement detector may, for example, include a register, a comparing circuit, and means for storing a quantity representative of a predetermined minimum displacement. When the recorder 34 receive information on the terminal lines 36 and 38 representing the coordinates of one point of the digitized line, a reset signal is immediately produced which is transmitted to the minimum displacement detectors over the line 90 to reset their registers to the valve of the signals supplied from the X and Y encoders 28 and 30 and which represent the coordinates of the recorded point. The comparator of each minimum displacement detector then compares the number stored in its register with the number supplied by its associated encoder 28 and 30 as the sensing point is moved from the recorded position, and when such comparison indicates that the sensing point has moved a distance equal to or greater than the predetermined increment in the associated coordinate direction an output signal is produced from the detector, the output signal for the detector 86 appearing on the line 92 and the output signal for the detector 88 appearing on the line 94. These two lines 92 and 94 are connected to an OR gate 96 so that its associated minimum coordinate increment has been traversed an output signal is produced from the OR gate 96 which is transmitted to the AND gate 84. Therefore, the AND gate 84 produces an output signal on its associated output line 98 only when both the comparator 64 indicates that the sensing point of the photodetector is properly registered with the line being digitized and one or the other of the minimum displacement detectors 86 and 88 indicates that the sensing point has moved a given predetermined increment from its previously recorded position. When these tow conditions are met an output signal appears on the line 98 which is transmitted to the two AND gates 100 and 102.

These AND gates 100 and 102 also have as inputs thereto, respectively, the output signals of the X and Y encoders 28 and 39, and have their outputs respectively connected to the output terminal lines 36 and 38. Accordingly, when an output signal does appear on the line 98 the gates 100 and 102 are opened to transmit the encoder signals to the recorder 34 over the lines 36 and 38. As soon as the recorder 34 does receive these encoder signals, a new reset signal is produced on the line 90 which is transmitted to the minimum displacement detectors 86 and 88 to reset their registers to the coordinate value of the newly recorded point and this resetting removes the output signals appearing on the line 92 and/or line 94, thereby conditioning the system for recording the next point after the sensing point of the photodetector has been moved through its given predetermined increment in either one of the two coordinate directions.

The functioning of the system of FIG. 2 for edge digitizing is substantially the same as that described above for line digitizing except that the switch 58 is moved to its alternate position to connect the differentiator 68 and negative pulse inverter 70 into the circuit between the amplifier 60 and comparator 64. The differentiator 68 serves to differentiate the signal supplied by the amplifier 60 so as to produce pulses corresponding to changes in such signal produced as the sensing point of the photodetector moves across an edge, and the negative pulse inverter 70 serves to invert the negative ones of such pulses so that all pulses supplied to the comparator 64 are of the same polarity. That is, through the action of the inverter 70, the same polarity of pulse is produced as the sensing point is moved across an edge from an area of high reflectivity to an area of low reflectivity as is produced when the sensing point is moved across an edge from an area of low reflectivity to an area of high reflectivity. Therefore, a pulse useable by the remainder of the system is generated each time the sensing point is moved across the edge being digitized regardless of its direction of movement and the edge may accordingly be digitized by moving the sensing point back and forth across the edge as it is moved generally therealong.

In FIG. 3, the waveform 104 represents the output of the amplifier 60 as the sensing point of the photodetector is moved back and forth across and edge being digitized with the edge separating an area of low reflectivity from an area of high reflectivity. The point *d* is the pint at which the sensing point moves across the edge in one direction and a point *e* is the point at which the sensing point moves across the edge in the other direction. The line 106 represents the waveform produced at the output of the differentiator 68 in response to its receipt of the waveform 104. As a result of its derivative action, the differentiator 68 produces pulses at the points *d* and *e* with the pulse 18 appearing at the point *d* being of positive polarity and with the pulse 110 appearing at the point *e* being of negative polarity. The negative-pulse inverter 70 serves to invert the negative pulse 110 so as to make it of positive polarity similar to that of the pulse 108.

The electrical circuit of the negative-pulse invertor 70 may take various different forms and a suitable circuitry is, for example, shown in FIG. 4. The output of the differentiator 68, indicated by the waveform 106, is supplied to the capacitor 112 which allows the positive and negative pulses of the waveform to pass therethrough The positive pulses pass directly through a diode 114 to the output line 116, but this diode blocks the negative pulses. The negative pulses, however, are passed through an inverting circuit comprising the resistors 118 and 120 and operational amplifier 122 to produce an inverted waveform as shown at 124. This inverted waveform is in turn applied to a diode 126 which permits the positive pulse to pass to the output line 116 but blocks the negative pulse. Since the positive pulse of the waveform 124 corresponds to the negative pulse of the waveform 106 the resultant output on the output line 116 is the waveform 128 having two positive pulses corresponding to the two opposite polarity pulses of the input waveform 106.

Again, as in the case of line digitizing, when edge digitizing, the reference source 80 provides a reference voltage to the comparator 64 which is less than the peak voltage of the signal pulses supplied to the comparator 64 from the negative pulse inverter 70. Therefore, whenever a signal does appear at the comparator 64 an output signal is produced from the comparator on the line 82 which controls the transmission of the X and Y encoder signals to the recorder 34 in the same manner as described above in connection with line digitizing.

FIG. 6 shows a reticle and photodetector assembly which is substantially similar to that of FIG. 5 except for additionally including an optical filer positioned between the artwork sheet 16 and the photodetector lens 53 for permitting selective digitizing of multicolor lines or edges of the artwork. The parts of the FIG. 6 device which are similar to that of the FIG. 5 device have been given the same reference numbers as in FIG. 5 and need not be further described. In addition to these parts, the assembly of FIG. 6 includes a filter wheel 130 having an optical filter disc 134 of glass or the like and supported for rotation about a vertical axis passing through its center by an arm 132 fixed to the post 48. The disc 134 is divided into four different areas 136, 138, 140 and 142, each of which may be selectively interposed between the lens 53 and the sheet 16 by rotating the filter wheel about its vertical axis relative to the arm 132. These four areas are of different light-transmitting characteristics and preferably each one is capable of transmitting only one associated color or frequency band of light which is substantially different from the color or frequency band of light transmitted by the other areas. Therefore, if the artwork 16 contains lines of different colors matching the various colors transmitted by the various different areas of the filter wheel 130, the filter wheel may be used to selectively render the photodetector responsive to only one of the lines by positioning the appropriate area 136, 138, 140 or 142 thereof between the lens 53 and the sheet 16. Of course the filter wheel 130 is intended to be exemplary only of one type of filter means which may be used and various other filter means may be substituted for the wheel 130 to serve substantially the same purpose. For example, the filter means may also consist of one or more separate filters each movable into or out of the path of the light rays between the artwork surface and the photodetector.

FIG. 7 shows another form of reticle and photodetector assembly which may be used with the digitizer of FIG. 1. Referring to this figure, the device there shown includes a reticle 144 carried by an annular frame 146 and supported from a generally vertical tube 148 by suitable means such as struts 150, 150. The tube 148 may be in turn attached to the carriage 22 of the digitizer of FIG. 1 and be used to move the reticle 146 over the sheet 16 containing the line, edge or other artwork being digitized. At the lower end of the tube 148 is a lens 152 which has such a focal length and is so arranged that a magnified real image of a small area of the surface of the sheet 16 is provided at the input surface of a photodiode or other photosensor 154 mounted in the upper end of the tube 148. Additionally, and as illustrated, the device of FIG. 7 may include means such as electric lamps 156, 156 carried by the struts 150, 150 for illuminating the surface of the sheet 16 in the area of the focal point of the lens 152. Of course, although not shown in the FIG. 7, the device of this figure may also be provided with a filter system, for example, one similar to that of FIG. 6, for permitting selective digitizing of multicolor lines or edges of the artwork.

I claim:

1. An automatic digitizing system for an X–Y coordinate digitizer used for digitizing features of an artwork placed thereon, said system comprising a photodetector adapted and arranged to receive only light transmitted from a small sensing point fixed relative to said photodetector and located on the surface of the artwork received on said digitizer, said photodetector being adapted to produce an output signal representative of the amount of light received thereby, means supporting at least one part of said photodetector for movement in the X and Y coordinate directions relative to such artwork to produce corresponding movement of said sensing point and to enable said sensing point to be moved to any location and along any line on said artwork surface, two encoders operatively connected with said photodetector for providing output signals representative, respectively, of the X and Y coordinate positions of said photodetector sensing point, two output terminals each associated with a respective one of said encoders, and control means responsive to the signal produced by said photodetector for causing said encoder output signals to be applied to or removed from said output terminals in accordance with the nature of said photodetector signal.

2. An automatic digitizing system as defined in claim 1 further characterized by an index means fixed relative to said one part of said photodetector for movement therewith and including means readily visible to an operator visibly marking an index point fixed relative to said sensing point of said photodetector, said photodetector being arranged so that said sensing point thereof is registered with said index point of said index means.

3. An automatic digitizing system as defined in claim 2 further characterized by said index means being a reticle.

4. An automatic digitizing system as defined in claim 1 further characterized by said photodetector including a photosensor located remote from said artwork surface, a lens fixed relative to said one part of said photodetector and located between said photosensor and said artwork surface for concentrating rays emanating from said artwork surface at the location of said sensing point onto said photosensor, and a tube having said lens located at one end thereof and said photosensor located at the other end thereof, said index means comprising a reticle fixed relative to said tube and located on the opposite side of said lens from said photosensor.

5. An automatic digitizing system as defined in claim 1 further characterized by means preventing the appearance of said encoder output signals at said output terminals until said photodetector sensing point has been displaced a given predetermined increment in either the X or Y directions from the position occupied during the preceding appearance of output signals at said output terminals.

6. An automatic digitizing system as defined in claim 1 further characterized by said photodetector including means for producing a voltage output signal having a value related to the amount of light received thereby, and said means responsive to the signals produced by said photodetector for controlling the appearance of said encoder output signals at said output terminals including means for producing a reference voltage signal, and a comparator for comparing said reference voltage signal with the output signal of said photodetector and for enabling the appearance of said encoder output signals at said output terminals only when said output signal of said photodetector exceeds said reference voltage signal.

7. An automatic digitizing system as defined in claim 1 further characterized by said photodetector including means for producing a voltage output signal related to the amount of light received by said photodetector, a differentiator connected with said photodetector for providing a signal which is the derivative of the output signal of said photodetector, and means for enabling the appearance of said encoder output signals at output terminals only when said derivative signal exceeds a predetermined given value.

8. An automatic digitizing system as defined in claim 7 further characterized by a pulse-inverter circuit connected with the output of said differentiator for converting all output pulses produced by said differentiator to pulses of a like polarity, and means responsive to the output pulses from said pulse inverter for enabling the appearance of said encoder output signals at said output terminals only when any one of said latter pulses exceeds a predetermined given value.

9. An automatic digitizing system as defined in claim 1 further characterized by said control means including means for causing said encoder output signals to be removed form said output terminals when said photodetector signal is within one range of values representing one range of amounts of light received by said photodetector and for causing said encoder output signals to be applied to said output terminals when said photodetector signal is within another range of values representing another range of amounts of light received by said photodetector.

10. An automatic digitizing system as defined in claim 1 further characterized by said control means including means for causing said encoder output signals to be applied to said output terminals only when said photodetector signal undergoes a rapid change indicating a rapid change in the amount of light received by said photodetector.

PO-1050
(5/69)

UNITED STATES PATENT OFFICE
CERTIFICATE OF CORRECTION

Patent No. 3,609,237 Dated September 28, 1971

Inventor(s) Heinz Joseph Gerber

It is certified that error appears in the above-identified patent and that said Letters Patent are hereby corrected as shown below:

Col. 1, line 50, following "photodetector" insert --in--.
Col. 2, line 5, "take" should be --taken--.
Col. 2, line 18, "instance" should be --instances--.
Col. 2, line 25, "is" should be --its--.
Col. 2, line 42, "FIg" should be --Fig--.
Col. 2, line 46, "an" should be --and--.
Col. 3, line 5, following "fixed to" cancel "an" and substitute --and registered with the index point of the reticle 20 and--.
Col. 3, line 20, "FIG.," should be --figure,--.
Col. 4, line 41, delete "and accordingly";
Col. 4, line 42, cancel the entire line;
Col. 4, line 43, cancel "tered with the line being digitized,".
Col. 4, line 58, "tow" should be --two--.
Col. 4, line 64, "receive" should be --receives--.
Col. 4, line 68, "valve" should be --value--.
Col. 5, line 6, following "so that" insert --as soon as either one of the detectors 86 and 88 shows that--.
Col. 5, line 17, "tow" should be --two--.
Col. 5, line 61, "and" (second occurrence) should be --an--.
Col. 5, line 64, "pint" should be --point--.
Col. 5, line 71, "18" should be --108--.
Col. 6, line 1, "of" should be --for--.
Col. 6, line 31, "filer" should be --fiber--.
Col. 8, line 39, "form" should be --from--.

Signed and sealed this 21st day of March 1972.

(SEAL)
Attest:

EDWARD M. FLETCHER, JR.
Attesting Officer

ROBERT GOTTSCHALK
Commissioner of Patents